INVENTORS
LLOYD V. BLACK and
JAMES B. MOORHEAD

Oscar L. Spencer
ATTORNEY

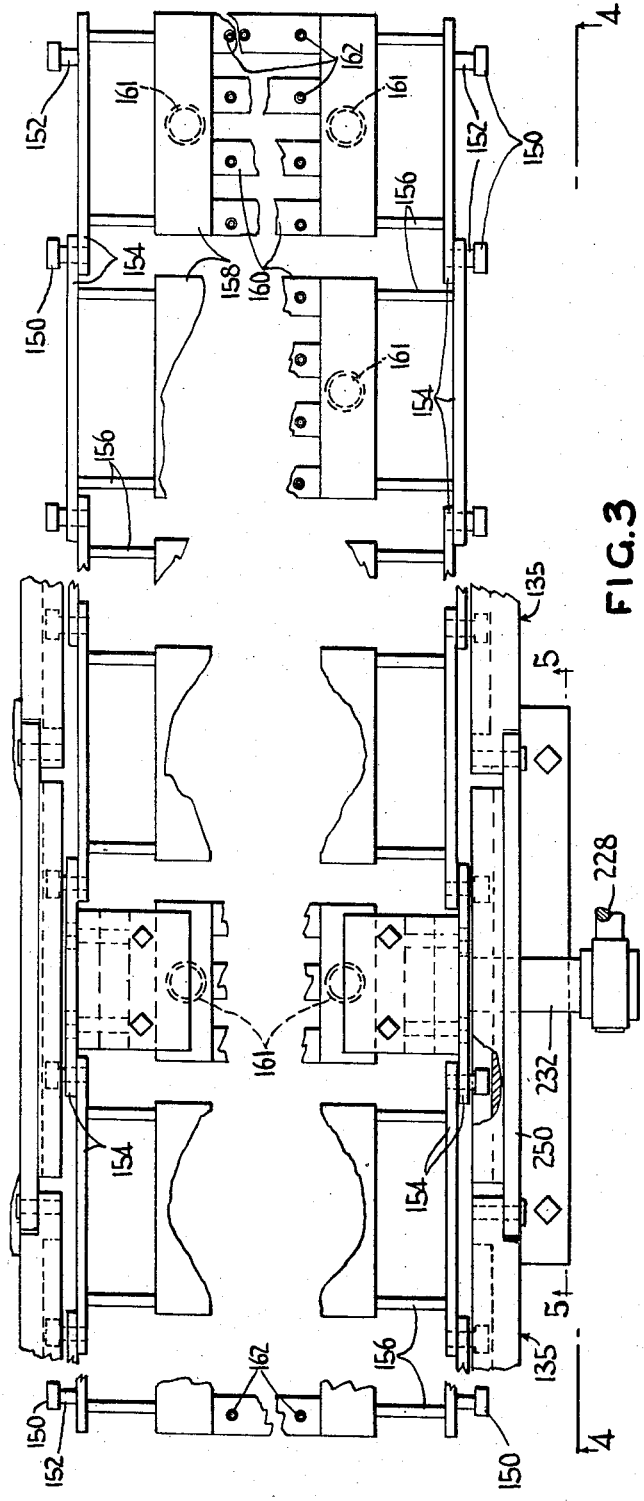
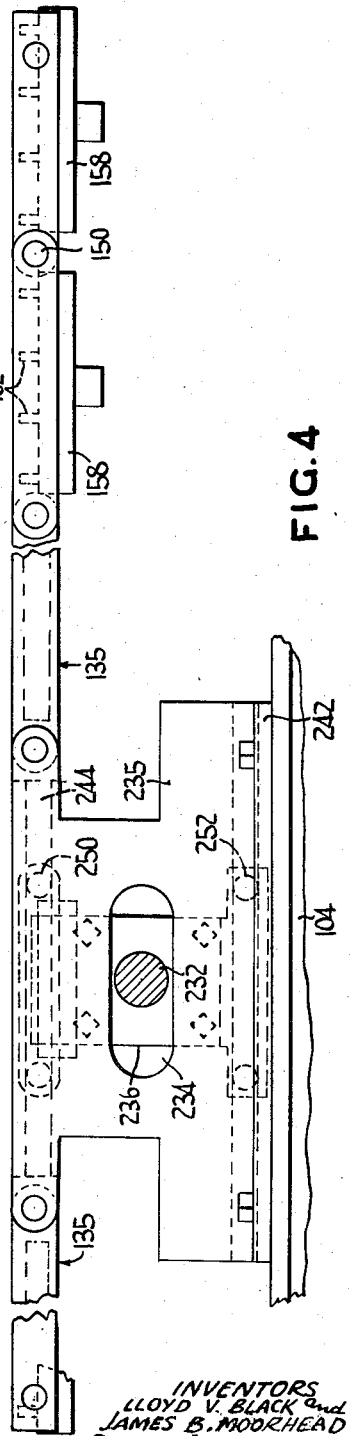
FIG. 3
FIG. 4
INVENTORS
LLOYD V. BLACK and
JAMES B. MOORHEAD
Oscar L. Spencer
ATTORNEY

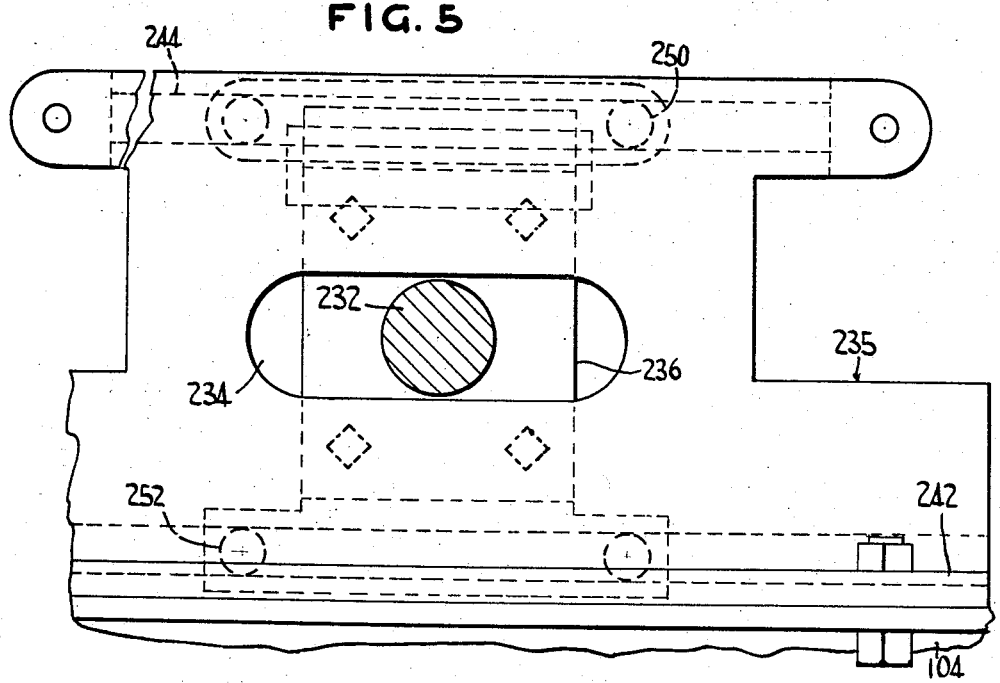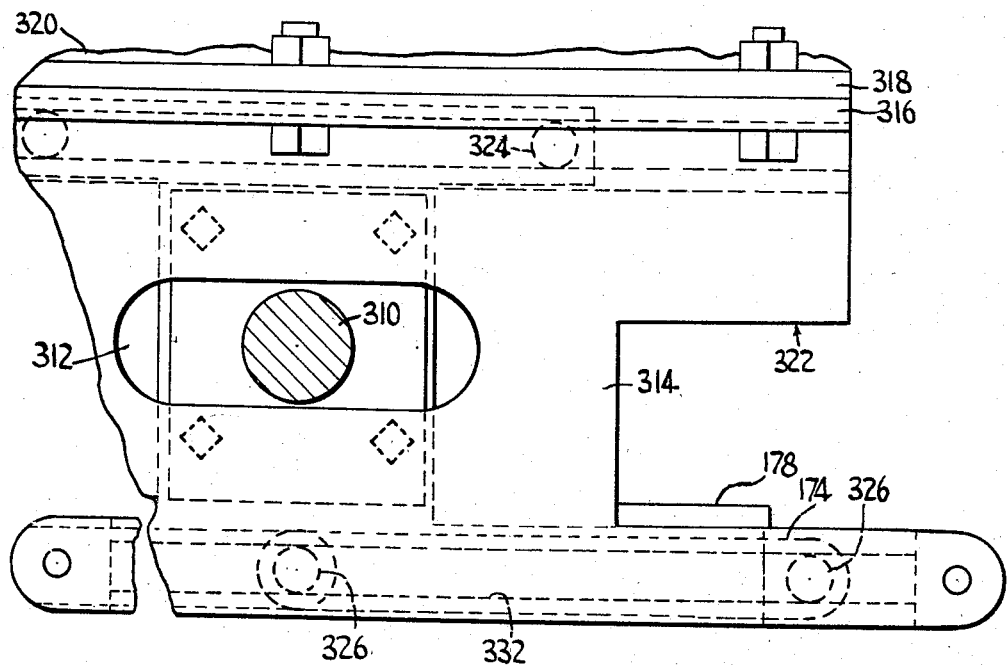

March 10, 1959 L. V. BLACK ET AL 2,876,592
APPARATUS FOR TEMPERING CURVED GLASS SHEETS
Filed July 28, 1954 10 Sheets-Sheet 5

INVENTORS
LLOYD V. BLACK
JAMES B. MOORHEAD
ATTORNEY

March 10, 1959   L. V. BLACK ET AL   2,876,592
APPARATUS FOR TEMPERING CURVED GLASS SHEETS
Filed July 28, 1954   10 Sheets-Sheet 6
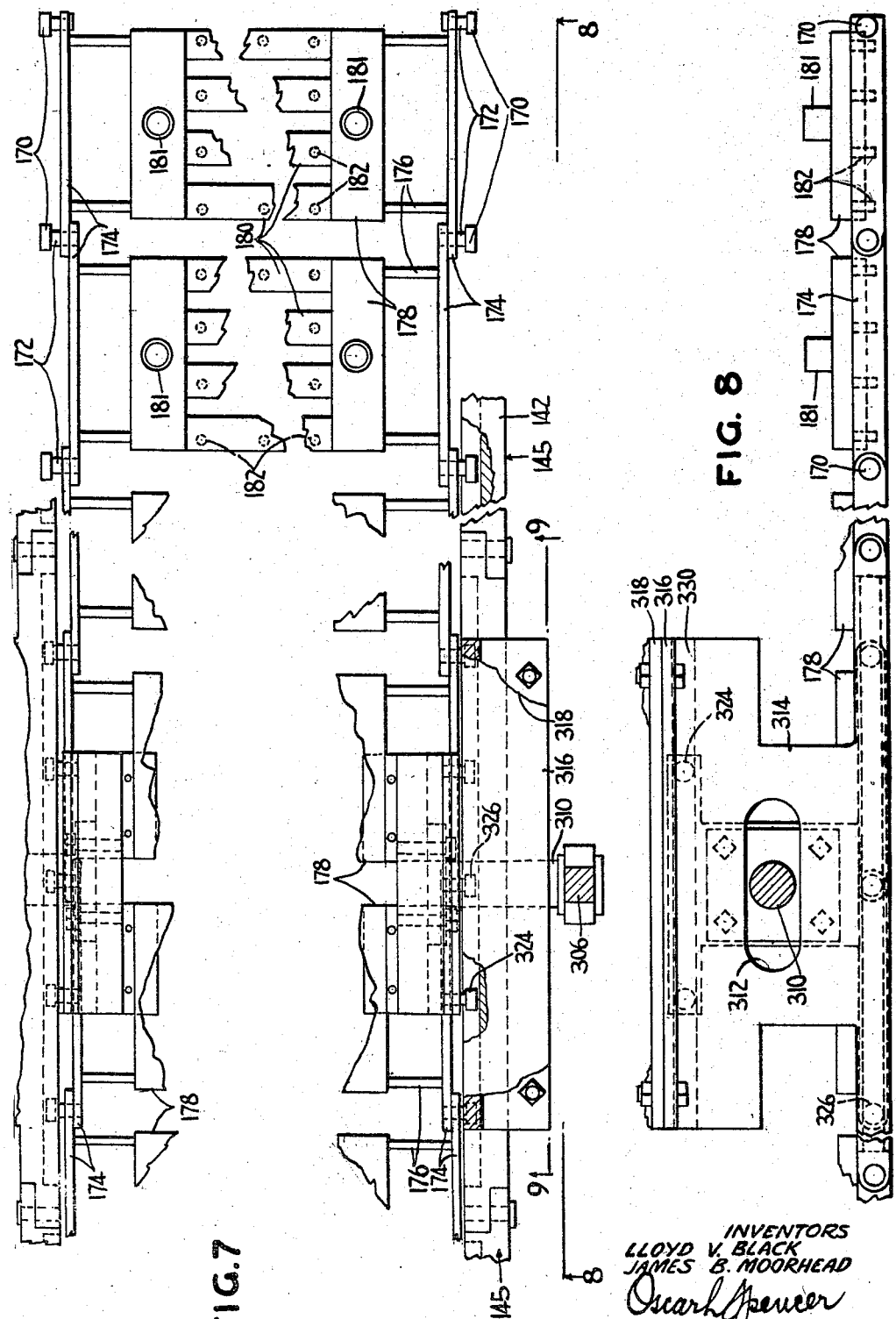
INVENTORS
LLOYD V. BLACK
JAMES B. MOORHEAD
ATTORNEY

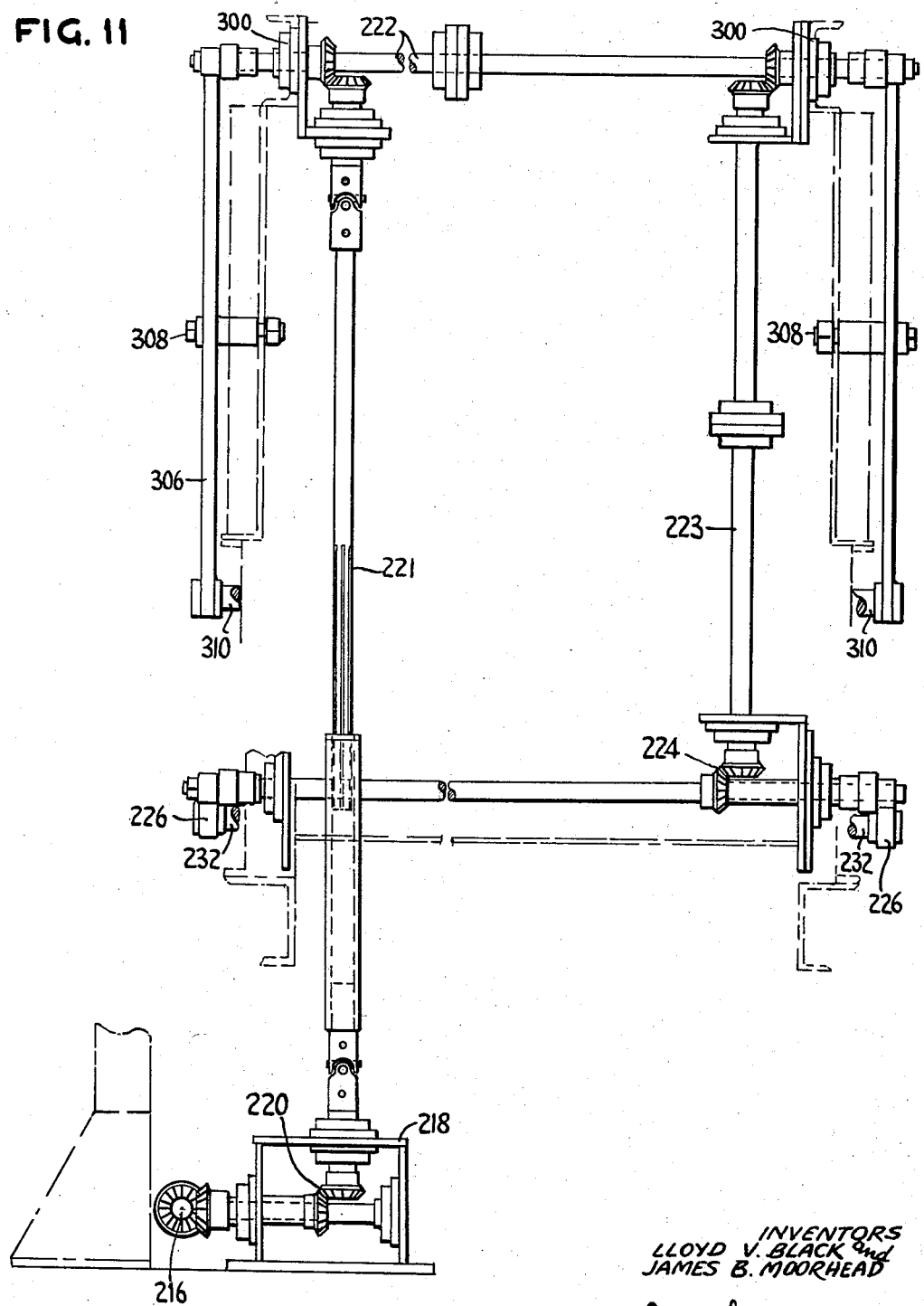

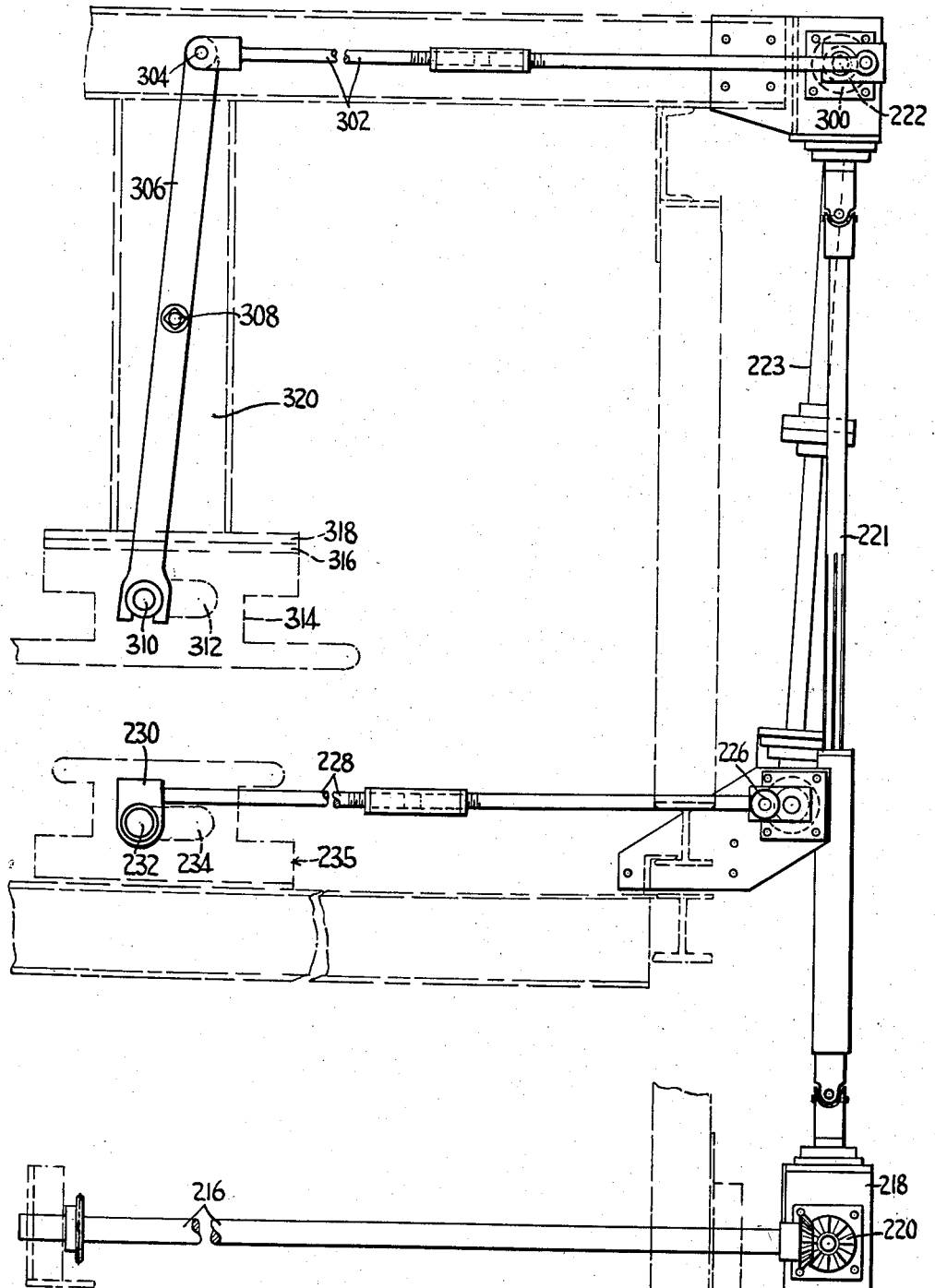

INVENTORS
LLOYD V. BLACK and
JAMES B. MOORHEAD
BY
Oscar L. Bemer
ATTORNEY

2,876,592

APPARATUS FOR TEMPERING CURVED GLASS SHEETS

Lloyd V. Black, Murphy, N. C., and James B. Moorhead, Tarentum, Pa., assignors to Pittsburgh Plate Glass Company Application July 28, 1954, Serial No. 446,276

11 Claims. (Cl. 49—45)

The present invention relates to apparatus for tempering glass, and especially concerns uniform tempering of curved sheets of glass of various shapes, particularly automobile backlights which have a central portion curved to a comparatively gentle contour merging into portions having sharply decreasing radii of curvature, thereby forming opposed end sections, the tangents to which are substantially perpendicular to the tangent at the center of the glass sheet.

In the process of tempering glass, the glass is provided with a skin having a highly compressive stress and an interior under tension. Such compressive stress at the glass surface increases the resistance of the glass to fracturing upon impact. According to conventional tempering operations, the glass is heated nearly to its softening point and then quickly quenched by uniformly exposing the glass surfaces to streams of a fluid such as air arranged to cool both surfaces uniformly and simultaneously. The even distribution of the cooling air on the glass surfaces is a prerequisite to uniform tempering and is usually accomplished by blasting the air through a plurality of uniformly spaced nozzles which are oscillated or rotated in a fixed pattern relative to the glass, which is fixed. When the outer surface or skin of the glass is broken, the locked up tension stresses within the glass cause it to shatter into a large number of very small pieces. The uniformity of size of the shattered particles indicates the uniformity of the glass temper.

In the past, when the requirements of automobile manufacturers called for the tempering of flat or nearly flat plates, the oscillation or rotation of the tempering nozzles took place in a flat plane, which was either vertical or horizontal, depending upon the type of furnace used to heat the glass for the first step of the tempering operation. In order to obtain a maximum cooling effect and maintain uniform cooling of the glass, it is important to observe the following precautions.

(1) The air blasts should strike the glass normal to the glass surface.

(2) The nozzles should all be equidistant from the glass.

(3) The nozzles should all be of the same size.

(4) The pressure of the air blast from each nozzle should be the same.

(5) The pattern of movement of the nozzles relative to the glass should be the same everywhere on the glass surfaces.

Typical prior art tempering apparatus include nozzles disposed on opposite sides of a glass sheet for directing a plurality of air blasts against the adjacent surface of the sheet and moving the nozzles to prevent formation of non-uniform temper patterns on the glass. Where the glass sheet is flat or includes shallow bent portions, the nozzles may be rotated in a flat plane substantially parallel to the general plane of the sheet to obtain a satisfactory temper.

When the glass sheet is provided with deep bends at the ends thereof, as in the present day automobile windshields and backlights, imparting a plane circular movement to the nozzles causes the latter to move toward and away from the bent end portions of the sheet. Such action causes non-uniformity of temper and also inhibits obtaining the desired degree of temper. When the nozzles move toward the sheet, the air, after impinging upon the sheet, is prevented from leaving, thus shielding the glass surface from additional cold air. This results in slow cooling and prevents obtaining the desired temper. When the nozzles move away from the sheet, the rate of cooling is also decreased because of increased diffusion of the cold air blast with the air warmed by its exposure to the heated glass.

According to the present invention, apparatus is provided for moving the nozzles in a predetermined pattern spaced a fixed distance from the glass sheet surfaces and means is included for varying the contour of nozzle movement to conform to the shape of the glass sheet being tempered. A typical apparatus utilizes two vertically spaced sets of interlinked nozzle members, each oscillatable along substantially horizontally extending tracks comprising vertically adjustable track members. The tracks are mounted in a frame horizontally reciprocable in quadrature to the horizontal component of nozzle member movement. Curved glass sheets are held stationary between the nozzle members. The opposite curved glass sheet surfaces are exposed to blasts of tempering fluid which impart overlapping circular patterns to the curved glass by virtue of the relative movement between the nozzles and the glass. This movement insures a uniform tempering pattern in the glass. The vertical adjustment of the track members enables changing the pattern of nozzle movements to conform to different glass curvatures.

One object of the present invention is to provide apparatus for tempering sheets of material of varying curvature wherein blasts of fluid are directed normally to the surfaces of the material to be tempered regardless of the shape of the material.

Another object of the present invention is to provide apparatus for tempering glass sheets having shapes providing substantially 180° of arc wherein the glass sheets are exposed to blasts of tempering fluid directed normally to the glass surfaces substantially uniformly thereof.

Another object of the present invention is to provide a method of tempering curved glass sheets involving suddenly chilling heated glass by directing blasts of fluid against opposed surfaces of the glass through movable nozzles arranged in a predetermined changeable contour and whose movements define overlapping circular patterns relative to the surface of the glass to provide a substantially uniform blast pattern on the glass.

Still another object of the present invention is to provide in glass tempering apparatus means for maintaining a plurality of air blast nozzles a substantially fixed distance from a curved object being tempered despite relative movement between the nozzles and the object so that uniform pressure blasts of tempering fluid may be imparted to each nozzle to temper the curved object uniformly.

These and other objects of the present invention will become apparent from the study of the accompanying drawings taken in conjunction with the following description.

The particular embodiment disclosed herein is described for purposes of illustration rather than limitation.

In the drawings:

Figure 3 is a sectional view of a lower nozzle assembly taken along the lines 3—3 of Figure 1 showing how the lower set of nozzle members are linked together;

Figure 4 is a frontal view along the lines 4—4 of Figure 3;

Figure 5 is an enlarged view along the lines 5—5 of Figure 3 showing a lower nozzle housing drive assembly;

Figure 7 is a lower plan view of the upper nozzle housing assembly taken along the lines 7—7 of Figure 1;

Figure 8 is a view along the lines 8—8 of Figure 7;

Figure 9 is an enlarged view taken along the lines 9—9 of Figure 7;

Figure 11 is a side elevational view showing the details of the mechanical linkages of drives which impart certain motions to the tempering apparatus;

Figure 12 is a view at right angles to Figure 11 showing another view of the various linkages for imparting the desired motions to the tempering apparatus;

*Frame and mounting structure*

Figure 1:
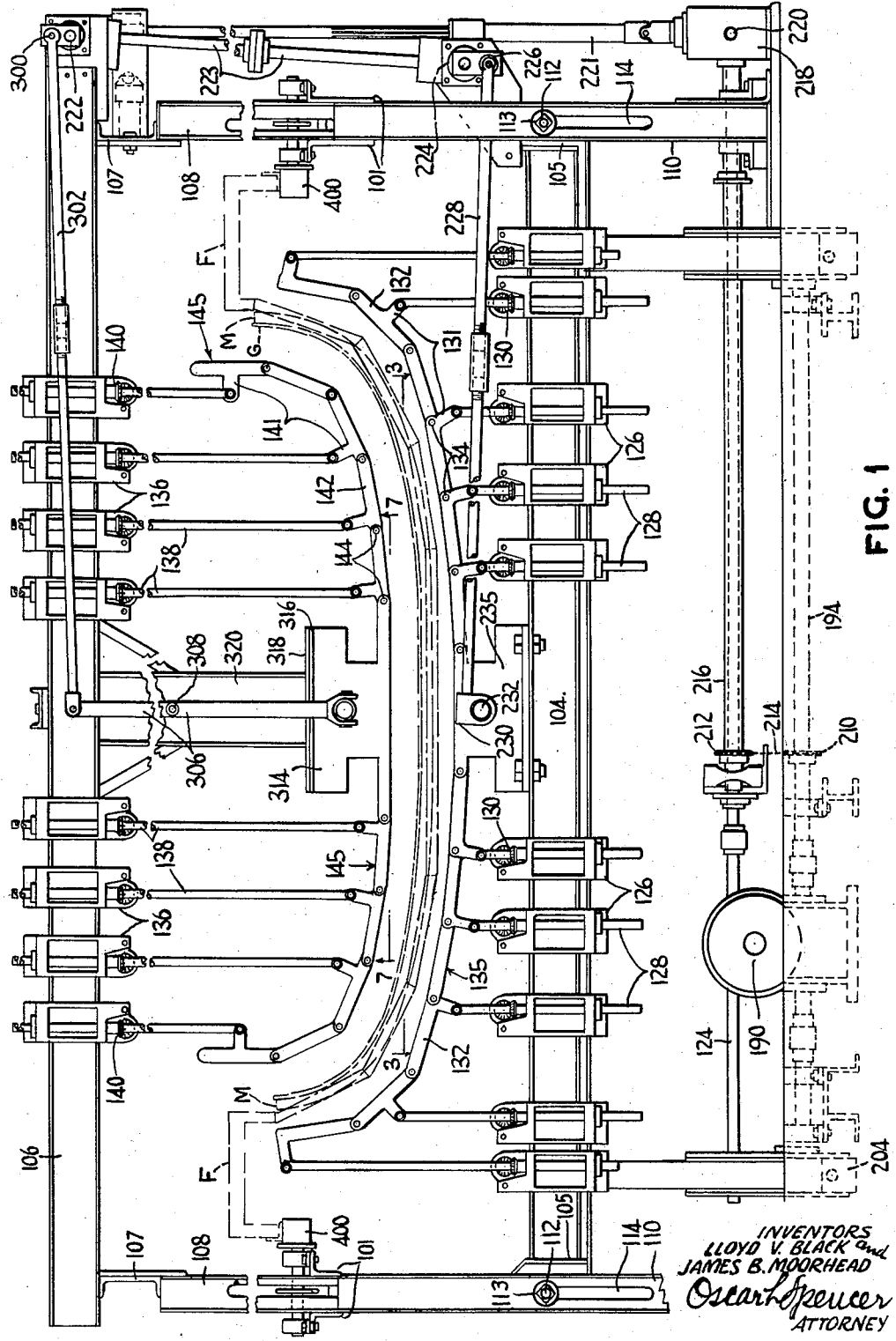
Figure 1 is an end elevational view of a tempering apparatus forming part of the present invention, with certain details omitted for the sake of clarity, showing the setting of the apparatus for receiving curved sheets of glass.

The present invention comprises a tempering apparatus of the oscillating nozzle type comprising a fixed housing 100 and a movable frame structure 102. Fixed housing 100, comprising slotted pillars 110, upper bracket beams 101 and lower bridge beams 103, is mounted on the floor of the building supporting the apparatus. The bridge beams 103 of the housing 100 contain projections 112, which render the former vertically adjustable. Projections 112 are in vertically disposed slots 114 contained in vertically extending posts 110 of the housing 100. Fastening members 113 fix bridge beams 103 in the proper vertical position relative to the post 110.

Movable frame structure 102 comprises front and rear lower frame members 104 interconnected by lower side members 105 and front and rear upper frame members 106 interconnected by upper side members 107. The upper and lower members are secured together by four vertical post members 108. A number of brackets 115 extend downwardly from each opposing lower side member 105. These brackets are so shaped as to clear bridge beams 103 sufficiently to allow relative movement. A threaded shaft 116 extends downwardly from each bracket 115 into engagement with an internally threaded worm gear 118 which is adjusted by rotation of 1 of 4 worm gears 120 interconnected by sprockets 122 and a shaft. Bracket housings 125 are mounted in fixed vertical position but are capable of moving slidably across the floor of the structure upon which housing 102 slides.

A hand wheel (not shown) is coupled to one of the worm gears 120 to actuate simultaneous rotation of all four worm gears, thus insuring that the adjustable frame structure 102 is moved uniformly in a vertical direction at all four corners thereof.

*Mechanism for adjusting contour of blowers to glass shape*

Brackets 126 are mounted slidably along the front and rear frame members 104 and may be fixed in position thereon by set screws. Each bracket 126 has mounted therein a vertically disposed adjustment rod 128 which is externally threaded. The threaded rods are each adjusted vertically by an individually adjustable miter gear mechanism 130.

Each of the vertically adjustable rods 128 is pivoted at its upper end to an ear 131 fixed to front or rear lower rail member 132. Hinges 134 interconnect the adjacent front lower rail members 132 to form a lower front track 135. Similar hinges interconnect the adjacent rear lower rail members to form a lower rear track. The contour of the lower tracks may be adjusted by varying the vertical position of each of the front and rear lower rail members by vertical displacement of adjustment rods 128 relative to brackets 126, sliding the latter if required to maintain the vertical disposition of the adjustment rods.

Similarly, slidable brackets 136 are mounted in spaced relation on the front and rear upper frame members 106 of the frame structure 102 and are provided with downwardly extending vertically adjustable rods 138 whose vertical position is controlled by means of miter gears 140. The lower extremities of rods 138 are pivoted to ears 141 fixed to upper rail members 142. Two sets of rail members 142 are hinged together at hinges 144 to form front and rear upper tracks 145. Adjustment of each of the rods 138 adjusts the contour of the upper tracks formed by upper rail members 142 in a manner similar to that provided for adjusting the lower rail members.

As seen in Figures 3 and 4, wheels 150 are mounted on shafts 152 extending from linked members 154. The wheels are movable relative to the tracks 135. Attached to each linked member 154 by a pair of rods 156 is a housing 158, which extends from adjacent the lower front track 135 to adjacent the lower rear track. Each housing 158 has a plurality of pipes 160 containing inlet ports 161 through which air under pressure is supplied (Figures 13 and 14), and a plurality of upwardly directed nozzles 162 for impinging air perpendicularly to the lower surface of a sheet of glass G in the tempering apparatus.

Figure 13:
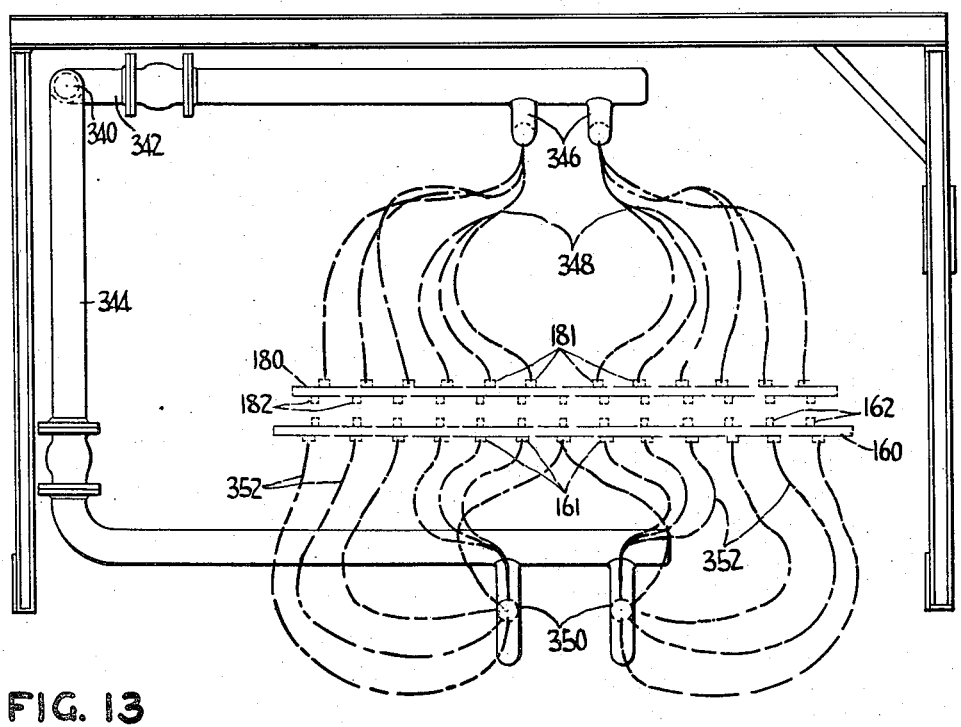
Figure 13 is a front elevational view showing the air supply arrangements for imparting air under pressure to the various tempering nozzles.
Figure 14:
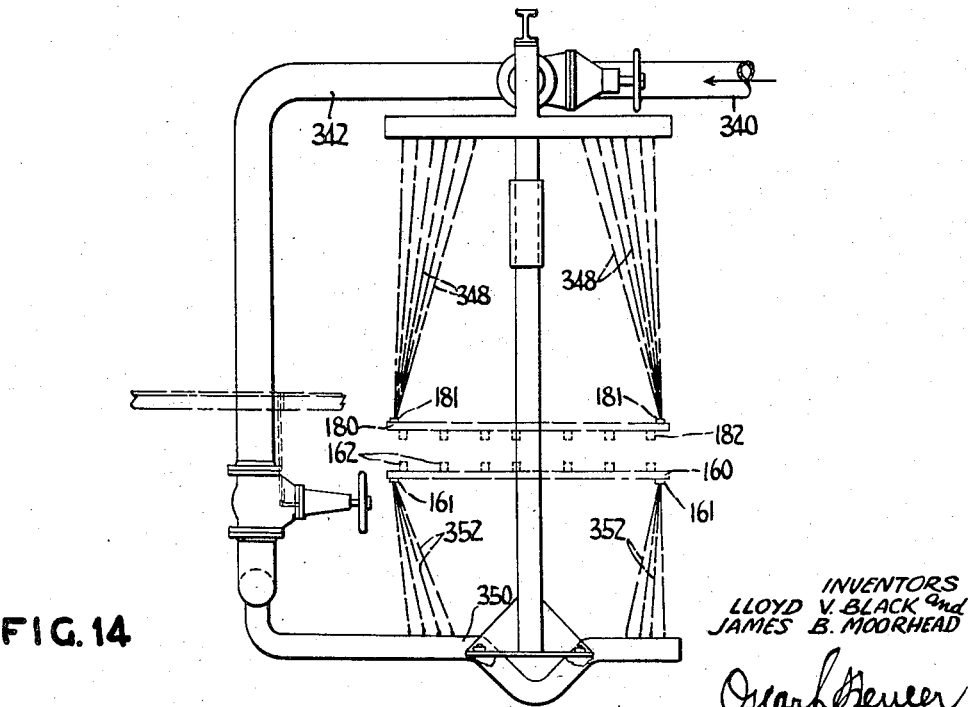
Figure 14 is a view at right angles to that of Figure 13.
Figure 15:
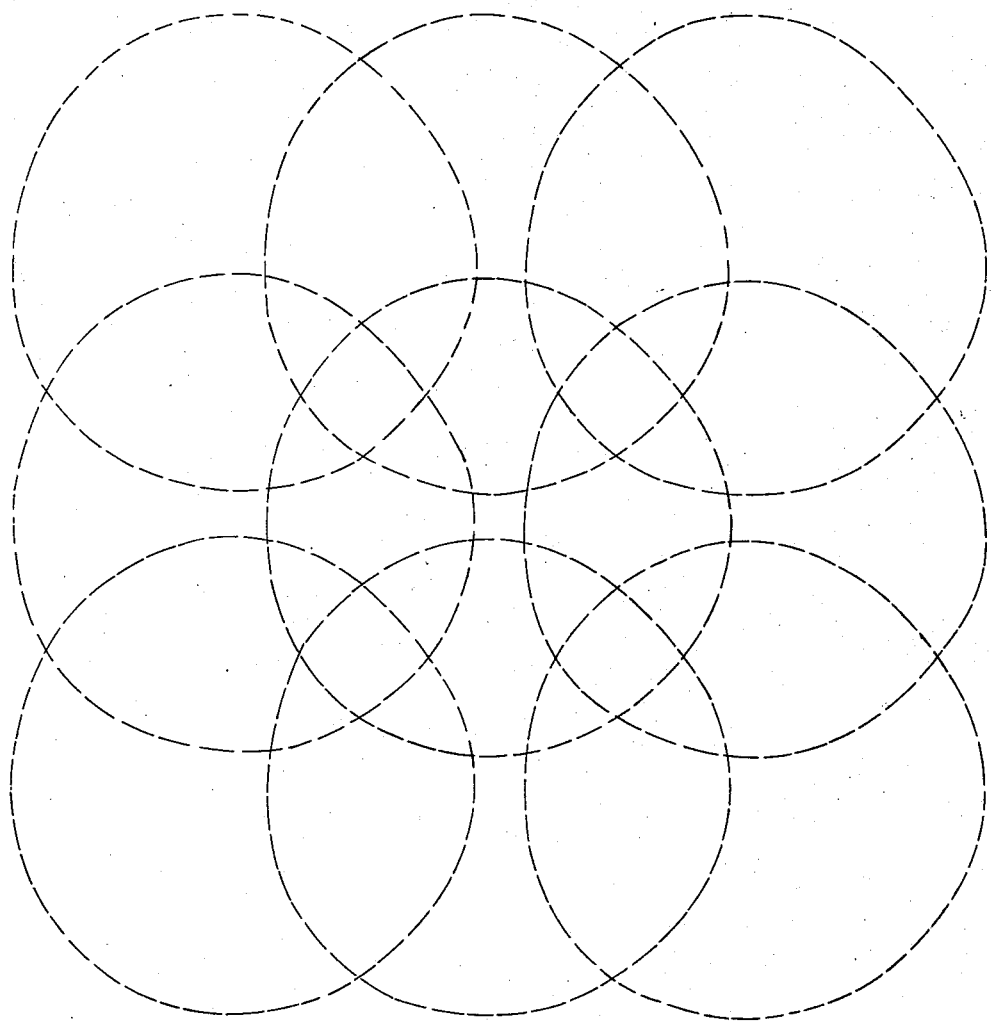
Figure 15 is a diagrammatic view of the air blast patterns produced by the individual air blast nozzles showing how a uniform blast pattern is produced on the glass surface.

Upper rail members 142 form upper tracks 145 which guide a plurality of wheels 170 (Figures 7 and 8) mounted on shafts 172 which interconnect enlarged link members 174 connected via rods 176 to laterally disposed housings 178 having pipes 180. Each housing has a plurality of inlet ports 181 and downwardly directed nozzles 182 as shown in Figures 13 and 14 to permit air to be blown perpendicularly to the upper surface of the glass to be tempered.

The spaced upper and lower tracks 145 and 135 thus provide guides for the oscillating movement of the upper and lower nozzle structures. By virtue of the linkages between the individual nozzle housings and the vertical adjustments of the upper and lower tracks, it is possible to adjust the train formed by linking the individual nozzle housings to conform its shape to that of the glass to be tempered. The vertical adjustment of the rail members 132 and 142 not only permits the configuration of the upper and lower tracks to conform to the shape of the glass, but also permits the adjustment for equal spacing between the nozzles and the glass G interposed between the upper and lower nozzle structures for tempering.

*Movement of oscillatory assemblies*

It is necessary for proper tempering that the air blasts be as uniform as possible throughout the entire surface of the glass. Hence, it is desirable that the nozzles be moved in a circular motion relative to the glass sheet. It is well known that a circular motion can be imparted to an object by providing two mutually perpendicular oscillating or reciprocating motions to the object wherein the two motions imparted are 90° out of phase with each other. Apparatus for imparting these motions will now be described.

Figure 2:
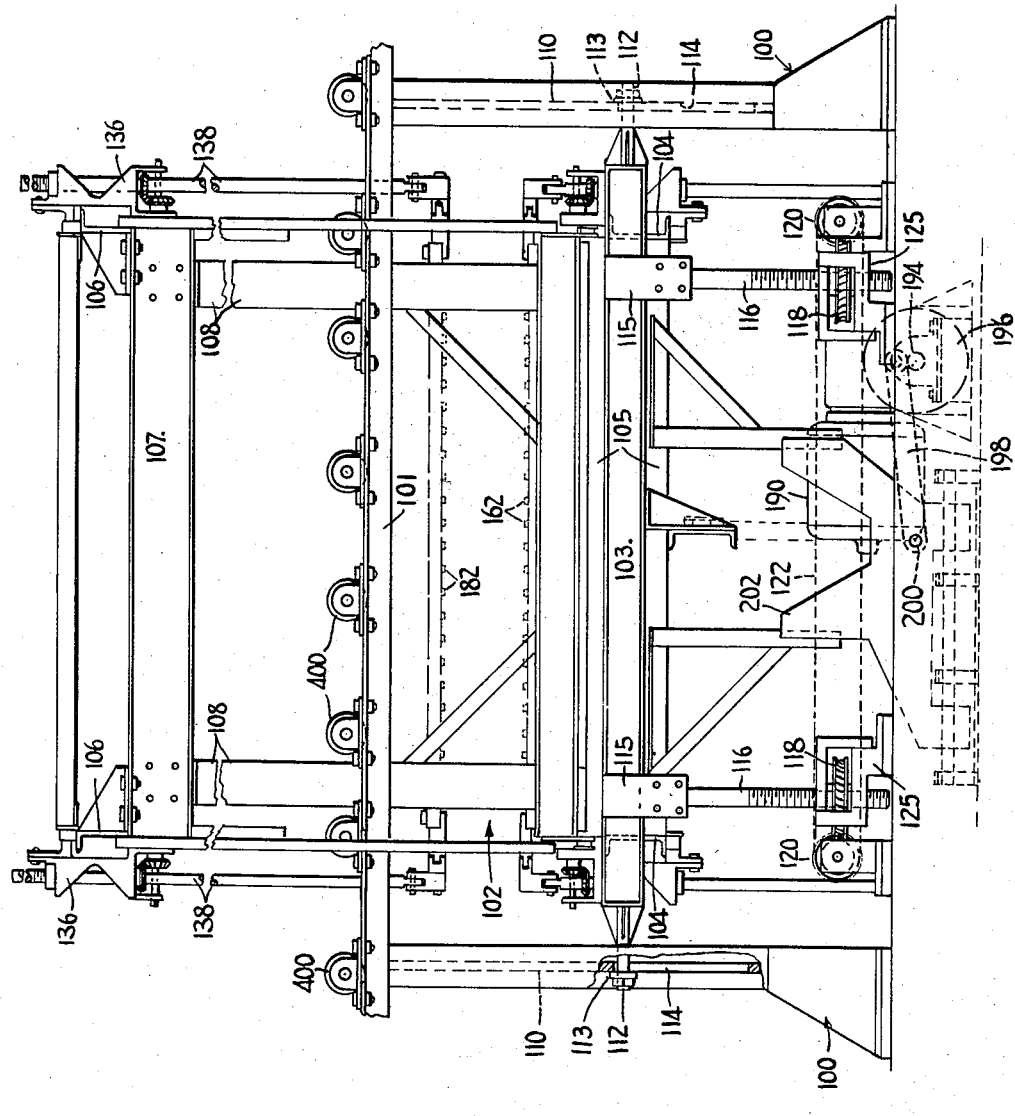
Figure 2 is a side elevational view of the apparatus shown in Figure 1, with certain other details omitted for simplicity showing the apparatus arranged to receive flat sheets of glass.
Figure 10:
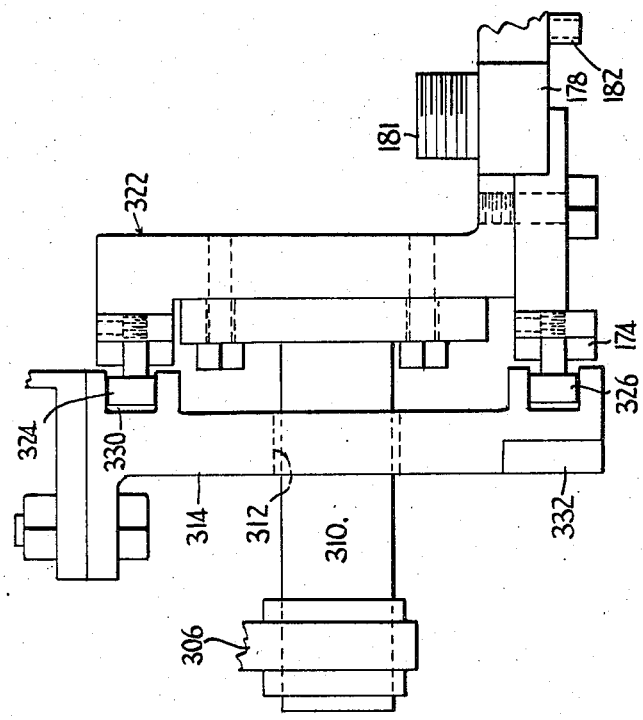
Figure 10 is a view taken at right angles to that shown in Figure 9.

Reciprocating motion from front to rear of the frame structure 102 is best shown in Figures 1 and 2. A motor 190 rotates a shaft 194 through a worm reducer gear (not shown). A crank 196 mounted on the end of the shaft 194 actuates a drive rod 198. The latter is hinged at 200 to a cross head 202 fixed to the movable frame 102. The cross head is mounted in a fixed guide 204 below the floor line of the housing. The motor 190 actuates shaft 194 and crank 196, thus causing drive rod 198 to force hinge 200 and cross head 202 to oscillate from front to rear of the housing 100. Thus, the entire frame structure 102 fixed to the cross head 202 reciprocates from front to rear therewith.

Left to right oscillation of the nozzle housings relative to the frame structure 102 is effected in the following manner, as shown in Figures 1, 11 and 12. A sprocket 210 is mounted on the main drive shaft 194 to drive sprocket 212 by virtue of a chain drive 214 interconnecting the sprockets. Sprocket 212 is fixed on a drive shaft 216 extending laterally of the frame structure 102 into a miter gear housing 218. A miter gear 220 in the gear housing provides a suitable coupling between the horizontally directed shaft 216 and a vertically directed spline shaft 221. Spline shaft 221 is geared to a horizontal shaft 222, which in turn is geared to a vertical shaft 223. The latter in turn is coupled to gearing 224 which drives a crank 226 which controls the lateral movement of a rod 228 hinged to a central linkage 230.

Figure 6:
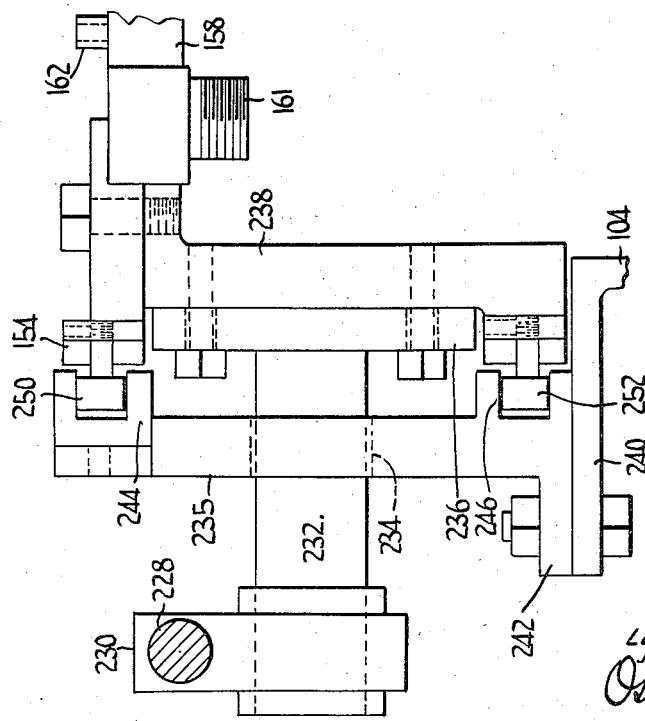
Figure 6 is a view of a portion of the element shown in Fig. 5 at right angles to that shown in Figure 5.

Linkage 230 is pivoted about a movable rod 232 adapted to slide laterally within a slot 234 provided in an upper slotted plate 235 as seen in Figures 5 and 6. Rod 232 is provided with flanges 236 for securing the latter to a carriage 238 which is disposed centrally of the lower linked rail members 132. Lower frame member 104 is provided with a laterally extending upper flange 240 to provide a means for securing a bottom flange 242 of the lower slotted plate 235 to adjustable frame housing 102. Plate 235 is provided with an upper rail 244 and a lower rail 246. Upper rail 244 provides the central portion of track 135. Linkages 154 are hinged to each of the upper wheels 250 at either side of the carriage 238. Upper wheels 250 and lower wheels 252 are mounted on the carriage 238 for movement within the rails 244 and 246 to insure that an oscillating translatory movement rather than a rotational movement is imparted to the carriage 238, fixing the orientation of the nozzles perpendicularly to the longitudinal direction of the track.

Essentially the same structure is provided to supply an oscillating motion to the upper set of tempering nozzles. Figures 1, 9, 10 and 12 show the construction details for imparting movement to the upper nozzle housings.

Cranks 300 are mounted for rotation with shaft 222 which is driven by spline shaft 221. A crank arm 302 is oscillated laterally as the crank 300 rotates. Crank arm 302 is pivoted at 304 to a lever arm 306. The latter is pivoted about pivot point 308 and fixed to a rod 310 mounted for movement within a slot 312 of an upper slotted plate 314. Plate 314 is provided with an upper horizontal flange 316 to facilitate attachment to a lower horizontal flange 318 of a vertical supporting beam 320. One of the latter is attached at its upper end to each upper horizontal beam member 106 of the frame structure 102.

A carriage 322 (Figs. 9 and 10) provided with upper wheels 324 and lower wheels 326 is fixed to rod 310. Plate 314 comprises an upper rail 330 for receiving upper wheels 324, and a lower rail 332 for receiving lower wheels 326 of carriage 322. The lower rails 332 provide the center portions of the upper tracks 145. The lower wheels 326 are hinged to links 174 which form a part of the upper tempering nozzle structure.

The individual tempering nozzles are provided with a circular motion by correlating the in and out movement imparted to the frame structure 102 by crank 196 with the left to right movement imparted to the linkages 154 and 174 via slotted plates 235 and 314 within the frame housings by cranks 226 and 300 respectively in such a manner that crank 196 is 90° out of phase with cranks 226 and 300. The latter two cranks are in phase with each other. The combination of the back and forth movement imparted to the frame structure 102 and the left to right movement imparted to the linkages 154 and 174 within tracks 135 and 145 respectively insures that the tempering nozzles are rotated in a circular path relative to the glass and are maintained a uniformly spaced distance from the glass regardless of the radius of curvature of the glass bend.

*Air supply mechanism*

Referring to Figures 13 and 14, the operation of the air supply apparatus will now be described. Air from high pressure source such as a compressor (not shown) is furnished through an air supply pipe 340 in the direction of the arrow shown in Figure 14. Pipe 340 terminates at a connection to feed pipes 342 and 344. Pipe 342 conducts the pressurized air into a plurality of manifolds 346 to which flexible air hoses 348 are connected at their upper ends. The lower ends of flexible air hoses 348 are connected to the air intake ports 181 of upper nozzle housing members 180. Similarly, pipe 344 conducts pressurized air into a pair of manifolds 350 to which a plurality of flexible hoses 352 are connected at their lower extremities. The upper extremities of the hoses 352 are connected to the air intake ports 161 of lower nozzle housing members 160. Thus, pressurized air is supplied via pipes 342 and 344 through manifolds 346 and 350 and flexible hoses 348 and 352 to the upper and lower nozzle housing members 180 and 160 respectively. The pressurized air supplied to the nozzle housings is blasted uniformly through nozzles 182 and 162 of the upper and lower nozzle housing members, respectively, toward the opposite surfaces of the glass.

*Operation of the tempering apparatus*

After the upper and lower rails have been adjusted to conform to the shape of glass to be tempered, flat glass sheets G are mounted on a bending mold M supported in a mold supporting frame F. The latter are introduced into a bending furnace where the glass is softened by heat to conform to the shape of the glass bending mold. Immediately upon completion of the bending operation, the hot bent glass is conveyed by means of a conveyor C provided with stub rolls 400 secured to bracket bridge beams 101 into the tempering apparatus where air is blasted through the tempering nozzles 162 and 182 against the lower and upper surfaces of the heated glass to complete the tempering operation. During the time that the air is being blasted against the glass surfaces, the various movements imparted by the cranks 196, 226 and 300 provide the proper relative motion between the movable members of the tempering apparatus and the fixed sheet of glass being tempered.

It is readily seen that each individual nozzle remains substantially perpendicular to the glass surface during tempering and its motion describes a circle over a portion of the glass surface. By proper choice of the amplitude of the reciprocation of the frame and the oscillation of the nozzle housing members relative to the spacing between nozzles, a uniform overlapping of the air blast patterns imparted through adjacent nozzles is obtained. Therefore, by applying a uniform pressure to the air blast coming from each nozzle, by having the cross-sectional area of the nozzles equal and maintaining the nozzles a fixed distance from the glass according to the teachings of the present invention, the glass is uniformly tempered.

The description of a particular apparatus contained herein is for illustration rather than limitation. For example, while the apparatus presently described is especially adapted for tempering glass sheets supported horizontally, the elements necessary to shape the nozzle housing members to follow the contour of a glass surface may readily be utilized for tempering vertically or obliquely supported sheets. The principal inventive concept of the apparatus lies in its ease of adjustability to conform the nozzle configuration and pattern of movement to whatever glass shape may require tempering.

What is claimed is:

1. In apparatus for tempering a curved sheet of glass wherein blasts of tempering fluid are imparted uniformly to opposite surfaces of the glass sheet through a pair of spaced sets of fluid nozzles flexibly arranged in substantially uniform spatial relation throughout said sets and movable relative to the glass, the improvement comprising guide means for constraining the movement of the nozzles to contours substantially parallel to the curved contour defined by the opposite major surfaces of the glass sheet, and adjustment means operatively associated with said guide means for adjusting the guide means to conform to different glass shapes, whereby the curved glass sheet is tempered uniformly.

2. In apparatus for tempering a curved glass sheet having a changing radius of curvature along an axis thereof, nozzle means including flexibly interconnected nozzles each imparting a blast of tempering fluid to opposite surfaces of the curved sheet, means for moving said nozzle means, guide means for constraining said movement relative to the glass in a contour parallel to the adjacent curved glass surface so that each blast is directed substantially perpendicularly to the localized portion of glass exposed thereto, the area of glass blasted by a single nozzle overlapping a portion blasted by a neighboring nozzle, and adjustment means operatively associated with said guide means for adjusting the contour of said guide means to conform to the shape of the glass being tempered, whereby the curved glass sheet is uniformly tempered.

3. Apparatus for tempering curved glass sheets comprising spaced nozzle means defining a curved spacing to receive curved sheets of glass therebetween, means for supporting a curved glass sheet in said curved spacing, means for moving said spaced nozzle means relative to opposite surfaces of said sheet, guide means for constraining the motion of each spaced nozzle means in a contour at a substantially uniform distance from each increment of the adjacent glass surface, means for reciprocating said guide means along an axis normal to a tangent to the curved axis of reciprocation for said nozzle means and adjustment means operatively associated with said guide means for adjusting the contour of said guide means to conform to the shape of the glass being tempered.

4. Apparatus as in claim 3, wherein the spacing defines a substantially U-shaped configuration.

5. Apparatus as in claim 3, wherein the nozzle means are moved in concert.

6. Apparatus as in claim 3, wherein the pattern of motion of the nozzle means is substantially circular relative to the surfaces of the glass.

7. Apparatus for tempering glass comprising a fixed structure, a reciprocable frame in said structure, a pair of spaced nozzle assemblies mounted for movement within said frame, each nozzle assembly comprising a plurality of interlinked nozzle housings, a set of spaced roller means at each end of each of said nozzle housings, fluid intake means on each nozzle housing for receiving a fluid under pressure, a plurality of nozzles on each of said nozzle housings, means interconnecting said intake means with said nozzles, an adjustable rail member for receiving each set of roller means, said adjustable rail members being secured to the reciprocable frame, means for oscillating said nozzle assemblies longitudinally of the rail members, and means simultaneously reciprocating said frame in quadrature to the movement of said nozzle assemblies, means for conveying and supporting a sheet of glass in the space between said nozzle assemblies, whereby a circular motion is imparted to each of said nozzles relative to the opposite surfaces of a sheet of glass interposed between said nozzle assemblies.

8. Apparatus as in claim 7, wherein each adjustable rail member comprises a plurality of individually adjustable rail sections adapted to form a contour paralleling the surface of a glass sheet to be tempered.

9. Apparatus for tempering glass sheets comprising a fixed structure, a frame slidable within said structure, means for reciprocating said frame relative to said structure in one direction, a pair of sets of vertically adjustable upper rail sections provided with inwardly directed grooves adjustably connected to the frame, means for adjusting each of said rail sections to provide an upper pair of substantially continuous grooves opposing each other, an upper set of interlinked housings, rollers at each end of the interlinked housings, said rollers engaging in the opposing upper grooves, nozzles in said upper set of interlinked housings extending downwardly therefrom, a pair of sets of vertically adjustable lower rail sections provided with inwardly directed grooves adjustably connected to the frame, means for adjusting each of said rail sections to provide a lower pair of substantially continuous grooves opposing each other, a lower set of interlinked housings, rollers at each end of the interlinked housings, said rollers engaging in the opposing lower grooves, nozzles in said lower set of interlinked housings extending upwardly therefrom, means for supplying fluid under pressure to said interlinked housings, and means for oscillating said interlinked housings along said rail sections in quadrature with the reciprocation of said slidable frame.

10. Apparatus for tempering a curved sheet of glass comprising a frame, curved guide means carried by said frame and extending longitudinally thereof, means for reciprocating said frame and said guide means flexibly interconnected nozzles arranged in spaced, opposed sets along said curved guide means, means for supporting a curved glass sheet between said nozzle sets, and means for reciprocating said nozzles out of phase with the reciprocations of said frame along paths defined by said curved guide means, whereby the nozzles define closed paths relative to the supported curved glass sheet to enable the nozzles to impart a uniform bath of tempering fluid over the entire area of the curved glass sheet.

11. Apparatus as in claim 10, including adjustment means operatively associated with said guide means for adjusting the curvature of said curved guide means.

References Cited in the file of this patent

UNITED STATES PATENTS

| Number | Name | Date |
|---|---|---|
| 2,137,061 | Quentin | Nov. 15, 1938 |
| 2,167,294 | Desprit | July 25, 1939 |
| 2,250,628 | Forbes | July 29, 1941 |
| 2,251,159 | Owen | July 29, 1941 |
| 2,263,679 | Ferre | Nov. 25, 1941 |
| 2,401,442 | Weihs | June 4, 1946 |
| 2,413,722 | Long | Jan. 7, 1947 |
| 2,677,918 | Bird et al. | May 11, 1954 |
| 2,680,936 | Grotefeld | June 15, 1954 |

FOREIGN PATENTS

| Number | Country | Date |
|---|---|---|
| 443,804 | Great Britain | Mar. 6, 1936 |
| 365,130 | Italy | Nov. 23, 1938 |
| 625,069 | Great Britain | June 21, 1949 |